US011334166B2

(12) United States Patent
Chukura et al.

(10) Patent No.: US 11,334,166 B2
(45) Date of Patent: May 17, 2022

(54) MULTI-SENSORY NOTIFICATIONS

(71) Applicant: International Business Machines Corporation, Armonk, NY (US)

(72) Inventors: Rachel Chukura, Washington, DC (US); Juan Jose Mondragon Sandoval, Atlanta, GA (US); Yu Feng, Norcross, GA (US); Kaitlyn Pannunzio, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/037,946

(22) Filed: Sep. 30, 2020

(65) Prior Publication Data

US 2022/0100274 A1    Mar. 31, 2022

(51) Int. Cl.
*G06F 3/01* (2006.01)
*G01W 1/10* (2006.01)
*G06F 3/04842* (2022.01)
*G06F 3/16* (2006.01)
*G06F 3/0488* (2022.01)

(52) U.S. Cl.
CPC ............. *G06F 3/016* (2013.01); *G01W 1/10* (2013.01); *G06F 3/0488* (2013.01); *G06F 3/04842* (2013.01); *G06F 3/167* (2013.01)

(58) Field of Classification Search
CPC .... G06F 3/016; G06F 3/04842; G06F 3/0488; G06F 3/167; G01W 1/10
See application file for complete search history.

(56) References Cited

U.S. PATENT DOCUMENTS

| 7,058,510 | B2 | 6/2006 | Kelly et al. |
| 7,139,664 | B2 | 11/2006 | Kelly et al. |
| 7,185,044 | B2 | 2/2007 | Ryan et al. |
| 7,461,137 | B2 | 12/2008 | Ryan et al. |

(Continued)

FOREIGN PATENT DOCUMENTS

| AU | 2015312344 B2 | 3/2016 |
| CN | 110750734 A * | 2/2020 |

(Continued)

OTHER PUBLICATIONS

IP.com prior art publication, Weather Sense: Bringing Weather to Life Through a Multi-Sensory, Immersive Experience, IP.com No. IPCOM000265245D, IP.com Electronic Publication Date: Mar. 18, 2021 (Year: 2021).*

(Continued)

*Primary Examiner* — James T Tsai
(74) *Attorney, Agent, or Firm* — Grant Johnson (57) ABSTRACT

A method for dynamically presenting a multi-sensory notification of a selected event in an application, a computer program product, and a system for dynamically presenting a multi-sensory notification for weather events in a mobile weather application. One embodiment may comprise presenting a multi-sensory experience to a user reflecting a selected phenomenon responsive to a user selection in an application. The multi-sensory experience may include presenting an animation, a sound, and a haptic pattern reflecting the selected phenomena. At least one of the sound and the haptic pattern may be dynamically adjusted to correspond to real-time data about the selected phenomena.

18 Claims, 7 Drawing Sheets

(56) References Cited

U.S. PATENT DOCUMENTS

| | | | |
|---|---|---|---|
| 7,486,201 B2 | 2/2009 | Kelly et al. | |
| 7,792,642 B1 | 9/2010 | Neilley et al. | |
| 7,983,843 B1 | 7/2011 | Neilley et al. | |
| 8,707,352 B1 | 4/2014 | Crespo et al. | |
| 8,981,915 B2 | 3/2015 | Birnbaum et al. | |
| 9,753,541 B1 | 9/2017 | Robert et al. | |
| 10,139,909 B2 | 11/2018 | Chaudhri et al. | |
| 2011/0074814 A1 | 3/2011 | Kelly et al. | |
| 2011/0076992 A1* | 3/2011 | Chou | G06Q 10/00 455/414.1 |
| 2011/0191272 A1* | 8/2011 | McGuire | G01J 1/0219 706/11 |
| 2012/0268292 A1* | 10/2012 | Rock | G01W 1/02 340/870.03 |
| 2014/0139450 A1 | 5/2014 | Levesque et al. | |
| 2014/0168114 A1 | 6/2014 | Mohammed et al. | |
| 2015/0293592 A1 | 10/2015 | Cheong et al. | |
| 2016/0048283 A1 | 2/2016 | Yang et al. | |
| 2016/0080682 A1* | 3/2016 | Diaz | G11B 27/32 386/227 |
| 2016/0378186 A1* | 12/2016 | Kim | G06F 3/016 345/156 |
| 2018/0373335 A1* | 12/2018 | Seiler | G06F 3/002 |
| 2019/0050055 A1 | 2/2019 | Chaudhri et al. | |
| 2019/0340940 A1* | 11/2019 | Elkabetz | G08G 5/0065 |
| 2020/0050332 A1 | 2/2020 | Yang et al. | |
| 2020/0128106 A1* | 4/2020 | McCormack | H04L 67/2809 |

FOREIGN PATENT DOCUMENTS

| | | |
|---|---|---|
| JP | 4262129 B2 | 5/2009 |
| KR | 101468250 B1 | 11/2014 |

OTHER PUBLICATIONS

"Weather Gods," App Store Preview, Printed Sep. 15, 2020, 2 pages https://apps.apple.com/us/app/weather-gods/id1041512978.

Quick, "Cryoscope gives users a feel for tomorrow's weather," New Atlas, Feb. 6, 2012, 8 pages Cryoscope: https://newatlas.com/cryoscope-haptic-weather-forecast/21347/.

* cited by examiner

MULTI-SENSORY NOTIFICATIONS

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present disclosure relates to systems and methods for providing multi-sensory notifications for events, and more specifically, to providing combined animation, sound, and haptic notifications for weather events.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One area where computing systems have been successfully applied is weather forecasting. Much of the current weather and weather forecast information used by individuals and businesses is obtained from weather reports prepared by weather forecasting companies, which are then transmitted by local television and radio stations to end users. Such weather reports and forecasts may also be provided in printed form, e.g., by a daily newspaper.

Weather reports are typically prepared by meteorologists using various local information sources (e.g., local DOPPLER radar) and national information sources (e.g., the NEXRAD radar system and satellites operated by the National Weather Service). The meteorologist may also employ computer implemented weather forecasting models in preparing a weather forecast report. A meteorologist may prepare and/or update several such reports throughout the day, and such reports may be provided as part of periodic radio and/or television broadcasts. An end user who is interested in the current or forecast weather conditions for a geographic location accesses such a weather report by tuning in to the television or radio broadcast of the report at the designated time, reading the paper, etc.

If severe weather threatens a particular area, an emergency radio or television broadcast may be made to provide such information to the public immediately, and, if necessary, continuously. For example, a television station may provide a display showing the counties and general nature of severe weather, (e.g., tornado watches, thunderstorm warnings, etc.) as part of its television broadcast, throughout the period during which severe weather threatens an area.

SUMMARY

According to embodiments of the present disclosure, a method for dynamically presenting a multi-sensory notification of a selected event in an application. One embodiment may comprise presenting a multi-sensory experience to a user reflecting a selected phenomenon responsive to a user selection in an application. The multi-sensory experience may include presenting an animation, a sound, and a haptic pattern reflecting the selected phenomena. At least one of the sound and the haptic pattern may be dynamically adjusted to correspond to real-time data about the selected phenomena.

According to embodiments of the present disclosure, a computer program product for dynamically presenting a multi-sensory notification of a selected event in an application. The computer program product may comprise a computer readable storage medium having program instructions embodied therewith. The program instructions may be executable by a processor to cause the processor to present a multi-sensory experience to a user reflecting a selected phenomenon responsive to a user selection in an application. The multi-sensory experience may include presenting an animation, a sound, and a haptic pattern reflecting the selected phenomena; and dynamically adjusting an intensity of the haptic pattern to correspond to real-time data about the selected phenomena.

According to embodiments of the present disclosure, a system for dynamically presenting a multi-sensory notification for weather events in a mobile weather application. One embodiment may comprise a mobile data processing system, comprising a processor and a memory, the memory containing program instructions for a mobile weather application. The mobile weather application may cause the processor to present a multi-sensory experience to a user reflecting a selected weather forecast responsive to a user selection in the mobile weather application. The multi-sensory experience may include presenting an animation, a sound, and a haptic pattern reflecting the selected weather forecast, wherein a rain forecast presents rain drop sounds and mild vibrations, a storm forecast presents thunder sounds and intense vibrations, and the animation is synced with the sound and the haptic pattern. The multi-sensory experience may also include dynamically adjusting an intensity of the sound and the haptic pattern to correspond to real-time data about the selected weather forecast.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to providing multi-sensory notifications for events; more particular aspects relate to providing combined animation, sound, and haptic notifications for weather events. While the present disclosure is not necessarily limited to such applications, various aspects of the disclosure may be appreciated through a discussion of various examples using this context.

Various systems and methods are disclosed for providing notifications for events, such as weather phenomenon. Some embodiments may start with a computer-implemented system for preparing a weather forecast, which may use detailed digital maps of geographic areas of interest, satellite imagery, local and national weather radar information, weather station data, local weather observers, etc., to generate weather forecasts. These weather forecasts may be customized for a particular area-of-interest (e.g., the user's current location, the user's path of travel, the user's destination, etc.) in some embodiments.

Some embodiments may transmit the weather forecasts and portions of the underlying data to an end user in different modes: as images and video that may be presented using software (e.g., a mobile application or "mobile app") executing on a mobile data processing system ("mobile DPS," e.g., a smartphone), transmitted as data and metadata that may be interpreted by the mobile app, or a combination of both modes. Such transmissions may also include representations of various weather phenomena, e.g., icons, animations, sounds, and haptic patterns, etc., to help summarize the underlying data and the forecast. These representations may be overlaid over the weather data, a map of a geographic area of interest, etc., at the mobile app.

The weather forecasts, the underlying data, the representations, the data, and/or the metadata may also be processed by the mobile app to generate weather symbols, color contours, or other representations customized for the geographic area of interest. Additionally, a series of such weather displays may be generated by the mobile app, and played back in sequence to provide displays indicative of the movement of weather phenomena through the geographic area of interest. Such mobile apps may further provide the end user with various tools for selecting, e.g., the geographic location to be displayed, reference points to be displayed on the geographic map, e.g., cities, roads, borders, etc., the source of weather information to be displayed on the geographic map, e.g., satellite imagery or radar, and how the weather information will be presented, e.g., symbols, color contours, etc.

One aspect in some embodiments of this disclosure may be the presentation of notifications related to severe weather phenomenon, such as storms, heavy rain, hail, flash flooding, high winds, down-bursts, tornadoes, etc. Some embodiments may, therefore, closely monitor storm developments in order to present the best available information to end users, and may further create multi-sensory notifications that can highlight important information, cut through the distractions of everyday life, and be easily comprehended by the end user.

Accordingly, one feature and advantage of some embodiments is a system and method for notifying end users of events, such as weather phenomenon, in a manner that is more easily understandable to the end user, such as users of mobile weather apps. Such systems and methods may be easily interpreted by the individual end users in a manner such that the end users can immediately understand the significance of the events being presented to the individual, such as a storm at the end user's location of interest.

Another feature and advantage of some embodiments is the presentation of notifications, such as for storms or other severe weather conditions, in a manner that is highly accessible to people with disabilities. There are currently more than one billion people living with disabilities in the world. Many of these people are unable to interact with traditional mobile apps due to an impairment to one or several of their senses. Accordingly, some embodiments may bring notifications for events, such as for weather phenomenon, to life through a multi-sensory experience e.g., combining touch, hearing, and sight. When interacting with devices according to embodiments of this disclosure, individuals who cannot utilize one or more of their senses may still benefit from the multi-sensory experience to be able to understand the event and its potential impacts. For example, in some embodiments, visual presentations may be based on current weather conditions (e.g., precipitation accumulation and/or intensity), sounds may reinforce the visual presentation by allowing the user to also hear what is in the forecast (e.g., the intensity of the precipitation or thunder), and haptics may be synced with the sound and visuals to represent the intensity of the event.

Beyond accessibility, all users may benefit from the multi-sensory notifications of some embodiments. Studies show that when users interact with information in a multi-sensory format, users become more cognitively and emotionally connected to the information. As a result, all users can leverage some embodiments to improve their interpretation of the data/forecasts. Put differently, some embodiments may leverage custom haptics, sounds, and animations to bring the weather-related information to life.

Moreover, some embodiments of the disclosure may tie the multi-sensory notification experience to the underlying data. For example, some embodiments may use custom haptic patterns to enable users to feel the weather forecast that is being shown to them on the screen for a more natural, engaging user experience. In order to achieve this benefit, some embodiments may sync one or more of the custom haptic patterns to the sound of individual weather related sounds and animations (e.g., raindrops, snowflakes, lightning, etc.) being played in the mobile app. Additionally, because the simple sound of individual raindrops may not be enough to express the desired experience, some embodiments may add a background sound to complement the visuals and custom haptics and to tie it all together (e.g., dramatic music, sound effects, etc.) In this way, some embodiments may add a whole new dimension to the user experience via the use of custom haptic patterns that will be complemented with original sounds and interactive visual animations.

Some embodiments may further add interactivity to the multi-sensory experience. For example, some embodiments may support actions, such as showing snow accumulate at the bottom of the device screen, allow the user to wipe away a frost animation, etc. if the weather forecast is for winter storms.

While embodiments of the disclosure are generally described with reference to weather-related mobile apps on a mobile DPS, various applications are not limited to the presentation of weather information. For example, some embodiments may be highly effective in instances that an end user may need to ingest the information in an alternate format because, for example, they cannot look at their mobile DPS. Additional illustrative applications include, without limitation, wearable devices, voice assistants, in-vehicle displays, etc. Similarly, some embodiments of the disclosure may be applied to a health and safety related mobile application (i.e., a health application or "health app"), and the custom multi-sensory notifications may be tied to a possible undesirable exposure (e.g., high pollen count, high UV index, poor air quality, etc.), which may further be modulated in intensity based on a predicted risk of harm for that particular end user. Embodiments of the disclosure may also be tied to a sports related mobile app (i.e., a sports application or "sports app"), and the notifications may be tied to significant events (e.g., scores by the user's favorite team, scores by the opposing team, game start, game ends, etc.)

Data Processing System

Figure 1:
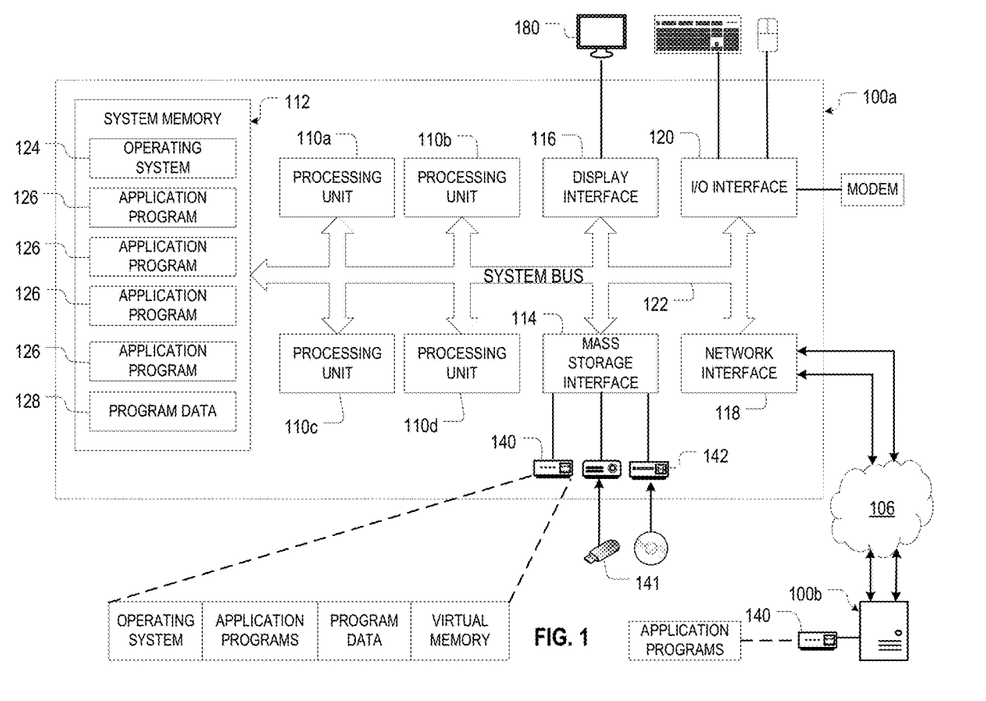
FIG. 1 illustrates an embodiment of a data processing system (DPS), consistent with some embodiments.

FIG. 1 illustrates an embodiment of a data processing system (DPS) 100a, consistent with some embodiments. The DPS 100a in this embodiment may be implemented as a personal computer; server computer; portable computer, such as a laptop or notebook computer, PDA (Personal Digital Assistant), tablet computer, or smart phone; processors embedded into a larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary. Moreover, FIG. 1 only depicts the representative major components of the DPS 100a, and individual components may have greater complexity than represented in FIG. 1.

The data processing system 100a in FIG. 1 comprises a plurality of central processing units 110a-110d (herein generically referred to as a processor 110 or a CPU 110) connected to a memory 112, a mass storage interface 114, a terminal/display interface 116, a network interface 118, and an input/output ("I/O") interface 120 by a system bus 122. The mass storage interface 114 in this embodiment connect the system bus 122 to one or more mass storage devices, such as a direct access storage device 140, universal serial bus ("USB") storage device 141, or a readable/writable optical disk drive 142. The network interfaces 118 allow the DPS 100a to communicate with other DPS 100b over the communications medium 106. The memory 112 also contains an operating system 124, a plurality of application programs 126, and program data 128.

The data processing system 100a embodiment in FIG. 3 is a general-purpose computing device. Accordingly, the processors 110 may be any device capable of executing program instructions stored in the memory 112 and may themselves be constructed from one or more microprocessors and/or integrated circuits. In this embodiment, the DPS 100a contains multiple processors and/or processing cores, as is typical of larger, more capable computer systems; however, in other embodiments the computing systems 100a may comprise a single processor system and/or a single processor designed to emulate a multiprocessor system. Further, the processors 110 may be implemented using a number of heterogeneous data processing systems 100a in which a main processor is present with secondary processors on a single chip. As another illustrative example, the processor 110 may be a symmetric multiprocessor system containing multiple processors of the same type.

When the data processing system 100a starts up, the associated processor(s) 110 initially execute the program instructions that make up the operating system 124, which manages the physical and logical resources of the DPS 100a. These resources include the memory 112, the mass storage interface 114, the terminal/display interface 116, the network interface 118, and the system bus 122. As with the processor (s) 110, some DPS 100a embodiments may utilize multiple system interfaces 114, 116, 118, 120, and busses 122, which in turn, may each include their own separate, fully programmed microprocessors.

Instructions for the operating system, applications and/or programs (generically referred to as "program code," "computer usable program code," or "computer readable program code") may be initially located in the mass storage devices 140, 141, 142, which are in communication with the processors 110 through the system bus 122. The program code in the different embodiments may be embodied on different physical or tangible computer readable media, such as the system memory 112 or the mass storage devices 140, 141, 142. In the illustrative example in FIG. 3, the instructions are stored in a functional form of persistent storage on the direct access storage device 140. These instructions are then loaded into the memory 112 for execution by the processor 110. However, the program code may also be located in a functional form on the computer readable media 142 that is selectively removable and may be loaded onto or transferred to the DPS 100a for execution by the processor 110.

The system bus 122 may be any device that facilitates communication between and among the processors 110; the memory 112; and the interfaces 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The memory 112 and the mass storage devices 140, 141, 142 work cooperatively to store the operating system 124, the application programs 126, and the program data 128. In this embodiment, the memory 112 is a random-access semiconductor device capable of storing data and programs. Although FIG. 3 conceptually depicts that device as a single monolithic entity, the memory 112 in some embodiments may be a more complex arrangement, such as a hierarchy of caches and other memory devices. For example, the memory 112 may exist in multiple levels of caches, and these caches may be further divided by function, so that one cache holds instructions while another holds non-instruction data, which is used by the processor or processors. Memory 112 may be further distributed and associated with different processors 110 or sets of processors 110, as is known in any of various so-called non-uniform memory access (NUMA) computer architectures. Moreover, some embodiments may utilize virtual addressing mechanisms that allow the DPS 100a to behave as if it has access to a large, single storage entity instead of access to multiple, smaller storage entities such as the memory 112 and the mass storage device 140, 141, 142.

Although the operating system 124, the application programs 126, and the program data 128 are illustrated as being contained within the memory 112, some or all of them may be physically located on different computer systems and may be accessed remotely, e.g., via the communications medium 106, in some embodiments. Thus, while the operating system 124, the application programs 126, and the program data 128 are illustrated as being contained within the memory 112, these elements are not necessarily all completely contained in the same physical device at the same time and may even reside in the virtual memory of other DPS, such as DPS 100b.

The system interfaces 114, 116, 118, 120 support communication with a variety of storage and I/O devices. The mass storage interface 114 supports the attachment of one or more mass storage devices 140, 141, 142, which are typically rotating magnetic disk drive storage devices, a solid-state storage device (SSD) that uses integrated circuit assemblies as memory to store data persistently, typically using flash memory, or a combination of the two. However, the mass storage devices 140, 141, 142 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 116 is used to directly connect one or more display units, such as monitor 180, to the data processing system 100a. These display units 180 may be non-intelligent (i.e., dumb) terminals, such as an LED monitor, or may themselves be fully programmable workstations used to allow IT administrators and customers to communicate with the DPS 100a. Note, however, that while the display interface 116 is provided to support communication with one or more display units 180, the computer systems 100a does not necessarily require a display unit 180 because all needed interaction with customers and other processes may occur via network interface 118.

The communications medium 106 may be any suitable network or combination of networks and may support any appropriate protocol suitable for communication of data and/or code to/from multiple DPS 100a. Accordingly, the network interfaces 118 can be any device that facilitates such communication, regardless of whether the network connection is made using present day analog and/or digital techniques or via some networking mechanism of the future. Suitable communication media 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 106. The Transmission Control Protocol/Internet Protocol ("TCP/IP") suite contains suitable network and transport protocols.

Notification System

Figure 2:
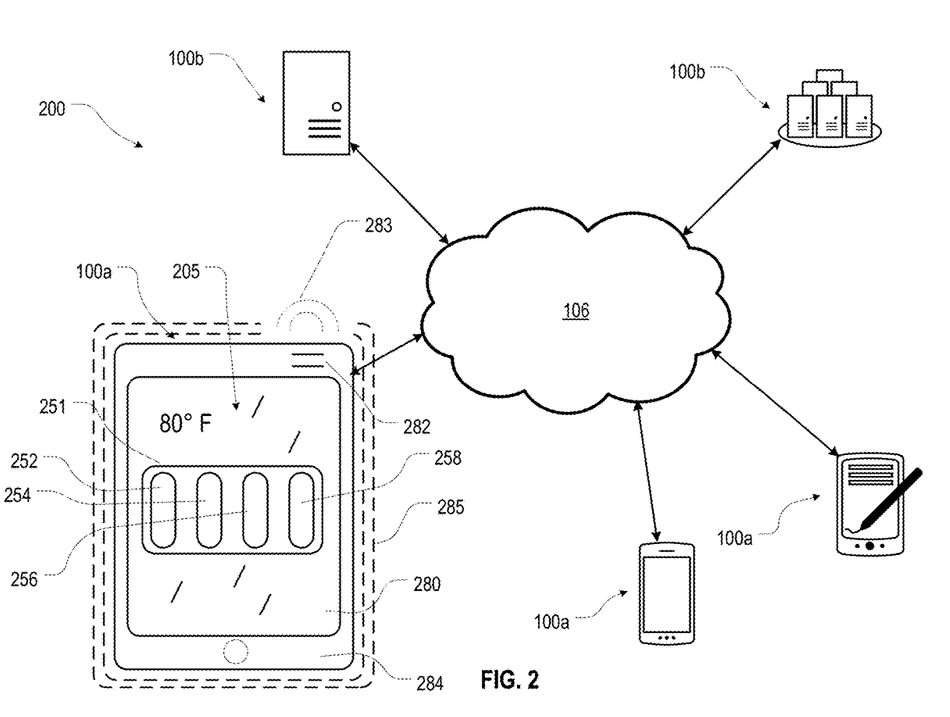
FIG. 2 is a system diagram showing a multi-sensory feedback system in operation, consistent with some embodiments.

FIG. 2 is a system diagram showing a multi-sensory feedback system 200 in operation, consistent with some embodiments. The multi-sensory feedback system 200 in FIG. 2 will be described with reference to a mobile weather app 205 executing on mobile DPS 100a for illustrative purposes. The mobile app 205 in this illustrative example may communicate over a network 106, such as the Internet, with one or more server DPS 100b. The mobile DPS 100a in FIG. 2 may include an integrated display 280, an integrated speaker 282 that emits sounds 283, and an integrated haptic system 284, such as a vibration motor or linear resonant actuator, that can controllably induce the mobile DPS 100a to vibrate 285.

The mobile app 205 in some embodiments may be adapted to receive weather information from a variety of sources, such as one of the servers DPS 100b, from which weather forecasts may be generated by the mobile app 205. In other embodiments, the mobile app 205 may be adapted to receive forecasts, weather data, and weather metadata from the server DPS 100b, which will collect, analyze, and/or summarize the weather information for the mobile app 205. Suitable sources of weather information may include national weather radar and satellite data, including high resolution visible and infrared satellite imagery. These weather information sources may further include an attributes table, which defines and/or provides detailed information concerning weather phenomena, including the characteristics of the phenomena therein (e.g., hail and vortex intensity and location, rain fall intensity, wind speed, etc.), as well as the position, direction, and speed of movement of the phenomena. This information may be updated by one or both of the DPS 100a, 100b on a periodic basis (e.g., approximately every six minutes). or according to a trigger (e.g., an alert, a significant change in circumstances, in response to a user request, etc.).

Live radar data and weather station reports may also be provided to one or both of the DPS 100a, 100b from one or more data services operated by third party information providers. Live radar data may include radar sweep information at intervals more frequent than the NEXRAD and satellite information. For example, a live radar sweep in some embodiments may generally be completed in thirty to ninety seconds, and if the live radar is operating to scan only a selected sector of interest, as often as every ten seconds. The weather station data may include such factors as current temperature, current dew point, current barometer readings, wind speed, etc. observed at a particular location. This data may further be geo-tagged with the location of that particular weather station.

Other sources of weather information which may be provided to the DPS 100a, 100b may include weather wire information from the National Weather Service, including weather warning bulletins authored by the National Weather Service Storm Prediction Center, and other related government agencies.

The DPS 100a, 100b may simultaneously receive weather information from multiple sites and sources, and the information received from such multiple sites and sources may overlap. For example, information for a single storm cell may appear in NEXRAD storm attributes tables from more than one site. Often, the storm attribute information for a single storm cell provided from different sites may not be identical. In such a case, the DPS 100a, 100b may select the attributes which are likely to be most accurate for a particular storm cell for use in generating storm tracks, in accordance with the present disclosure. For example, the DPS 100a, 100b may automatically select information for a particular storm cell from a NEXRAD site that indicates the greatest storm intensity, or some other user selected characteristic, or combination of characteristics, for the cell. If information for a particular storm cell from more than one NEXRAD site indicates the same intensity, or other characteristics, for the storm cell, the information from the NEXRAD site nearest to the storm may be selected.

In some embodiments, the mobile app 205 may compare weather data and/or metadata to a local profile (not shown). The local profile may specify that the received weather data and/or metadata match: a) be within a range, and/or b) be greater than or less than one or more trigger values. For example, a mobile app 205 may include a command to create notifications describing storm conditions if the mobile app 205 is located in an area where the current or expected rainfall is expected to exceed 0.5" over the next hour. In contrast, in other areas without such conditions, the mobile app 205 may simply collect and store the data and/or metadata. In this way, the server DPS 100b may not have to determine which mobile apps 205 serve areas expecting storm conditions in some embodiments. Instead, the server DPS 100b may only transmit generic data and metadata, and the determination of whether or how to notify the end user is made by the respective mobile apps 205.

The mobile apps 205 in some embodiment may include a home screen 250, which includes a temperature time-frame 251 containing breakouts for morning 252, afternoon 254, evening 256, and overnight 258. A user may interact with the home screen 250 using, for example, a gesture 260 (e.g., a tap and hold gesture, a simple tap gesture, or even as a result of a layout change within the mobile app 205) on one of the temperature breakouts 252, 254, 256, 258. In response, the mobile app 205 may display both the weather forecast and a multi-sensory notification for the selected temperature breakout 252, 254, 256, 258.

In operation, in response to an interaction by an end user with the time-frame 251, some embodiments may generate multi-sensory notifications based on the forecast weather conditions for a selected breakout 252, 254, 256, 258 using, for example, UIKit framework's UIKit Dynamics to provide 2D physics-related capabilities and animations for dynamic items. While the end users are viewing the visual animations, some embodiments may also produce sounds that match that weather condition, which may be generated using, for example, AVFoundation framework's AVAudioPlayer. In addition, custom patterns of vibrations may be triggered in parallel with the intensity and sharpness of the vibrations being adjusted based on the forecast weather condition. For example, if the rain is intense and accumulating, some embodiments may initiate a different (e.g., sharper, more intense) haptic pattern than that of a light rain with minimal accumulation (e.g., milder, less intense). (UIKit framework and AVFoundation framework are available from Apple, Inc.)

Notification Method

Figure 3:
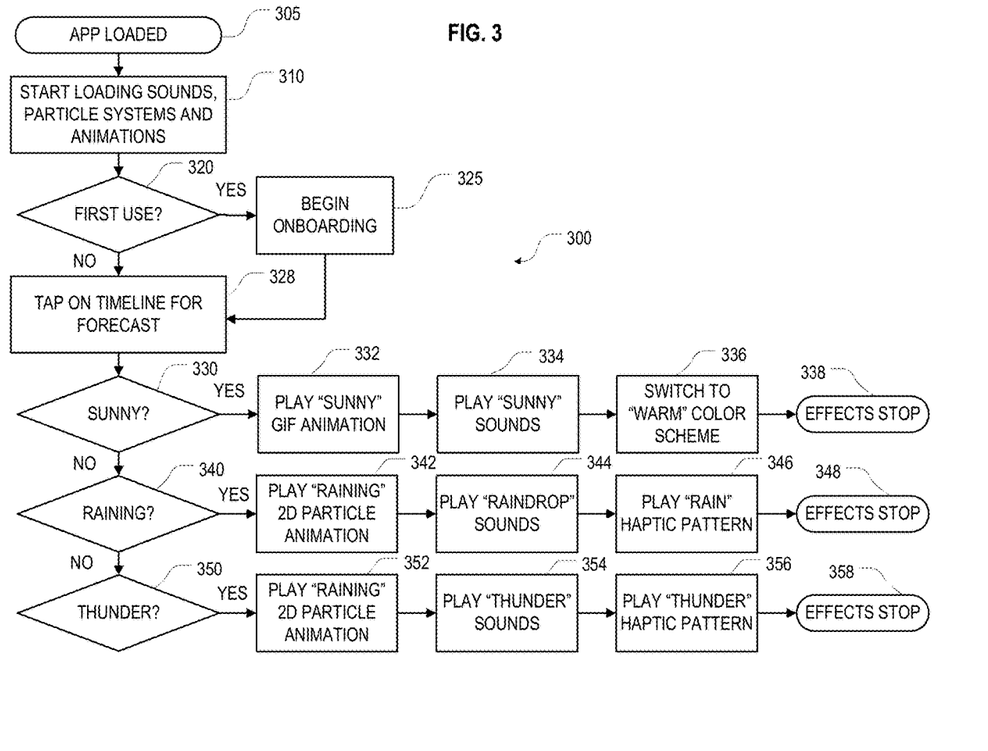
FIG. 3 is a flow chart illustrating one method of employing a mobile app to provide multi-sensory feedback, consistent with some embodiments.

FIG. 3 is a flow chart illustrating one method 300 of employing the mobile app 205 to provide multi-sensory feedback, as applied to the continuing illustrative example of storm warnings, consistent with some embodiments. The method 300 in this illustrative example may begin at operation 305 by loading the mobile app 205 by the DPS 100a. At operation 310, the mobile app 205 may receive weather information from the source(s) themselves and/or from the server DPS(s) 100b. Next, the mobile app may load pre-generated sounds, particle systems, animations (e.g., GIFs), and haptic patterns for a variety of weather phenomena and at a variety of intensity levels at operation 315.

At operation 320, the mobile app 205 may determine if this is the user's first use of the mobile app 205. If so, the mobile app 205 may begin an on-boarding process at operation 325. This may include establishing the user profile. Alternatively, an end user may establish the user profile by connecting with the server DPS 100b over the network 210 using the mobile DPS 100a.

A user profile generator function, running on the mobile DPS 100a or server DPS 100b, may provide a user profile set-up page. The user profile set-up page may include an interface that prompts a user to provide a name, contact address, and location identification. Additionally or alternatively, the user profile set-up menu may ask for permission to use location services on the user's mobile DPS 100a, such as an integrated global positioning system receiver.

The location information may further include identifying information for geographic location(s) at which the user is interested in receiving notifications. For example, one location may be the user's current location, another their home or work location, another being the location of future vacation activity. Various methods may be used for identifying the desired location. For example, the user may provide a street address or a United States Postal Service zip+4 code, either of which will identify a location of interest with sufficient detail. The DPS 100a, 100b may further convert the specific location information entered by the user into a standardized format, such as latitude/longitude coordinates. For this purpose, the DPS 100a, 100b may employ a geographic location database or data service, which may include a table or other data structure for converting street addresses, zip+4 codes, etc., to corresponding latitude/longitude coordinates.

The user also may also be prompted to establish alert preferences, which may define the characteristics of events for which the user desires the multi-sensory notifications to be provided. For example, these preference may include that the user requests that the notifications be optimized for low vision, higher contrast, higher sound volume, higher haptic intensity, etc. The user may also be prompted to select temporal preferences. For example, a user may be prompted to select from one profile for use between 8:00 AM and 6:00 PM on weekdays, another for use at night and on weekends. The user may also be prompted to select geographic preferences, such as separate profiles for a work and home location. The user may additionally be prompted to set notification intensity preferences, for example, to provide whether to provide haptic and sonic feedback only to for the most severe weather phenomena, for most weather phenomena, or all weather phenomena. This intensity level may also include volume limits and haptic intensity limits in some embodiments.

Periodically or continuously, the DPS 100a, 100b may run a weather modeling algorithm to forecast expected conditions at various times, generate storm tracks, etc. The storm tracks generated may include detailed information concerning attribute characteristics of a storm (e.g., tornado activity, hail, heavy precipitation, etc.) as well as the current location of the storm and a predicted path of the storm. Such a storm track may be generated using various different forms of weather information, e.g., weather information provided by NEXRAD, live radar, and other weather information services, as discussed above.

With continuing reference to FIG. 3 and the illustrative example, the end user may tap, swipe, or otherwise indicate in the mobile app 205 that they wish to view a real time forecast for the selected location or locations at operation 328. In response, the mobile app 205 may first determine a weather condition. For example, if the forecast weather condition is for sunny weather conditions at operation 330, the mobile application may then automatically start playing an animation associated with sunny conditions at operation 332 (e.g., a smiling sun GIF), automatically play a sound associated with sunny conditions at operation 334 (e.g., birds chirping), and/or automatically begin transitioning the color scheme in the mobile app to more warm colors (e.g., reds/yellows) at operation 336. After additional user input or a predetermined amount of time, the multi-sensory effects may stop at operation 338

At operation 340, the mobile app 205 may determine if the forecast is for rainy weather conditions. In response, the mobile application may automatically start playing an animation associated with raining conditions at operation 342 (e.g., two dimensional raindrop particle effects, animated to simulate falling across the screen). In some embodiments, this animation may be further selected based on expected rain accumulation, in total or during a particular interval (e.g., a few, small rain drops vs. many, large rain drops). At operation 344, the mobile app may also begin to play rain related sounds (e.g., rain sounds), again synced to the animation begun at operation 342. At operation 346, the mobile app will activate a haptic actuator on the mobile DPS, again synced to the animation and sound effects. The amplitude and frequency of this haptic effect may also be adjusted on the real time rain accumulation data, the intensity of the forecast rain, etc., and may also be synced to the audio and visual information. For example, a light rain may use a relatively mild vibration pattern (e.g., vibrations below a predefined threshold intensity value), whereas a heavy rain may use a relatively intense vibration pattern (e.g., above a predefined threshold intensity value). After additional user input or a predetermined amount of time, the multi-sensory effects may stop at operation 348.

At operation 350, the mobile app 205 may determine that the forecast is for thunderstorm conditions. In response, the mobile app 205 may automatically start playing an animation associated with a rain condition at operation 352 (e.g., the 2D particle animation played at operation 342, a lightning GIF animation, or both). In some embodiments, this animation may be further selected based on an expected severity of the thunderstorm, in such as total rain accumulation, expected lighting strikes, etc. At operation 354, the mobile app 205 may also begin to play storm related sounds (e.g., thunder sounds), again synced to the animation begun at operation 352 and modified based on forecast storm intensity. At operation 356, the mobile app 205 may activate a haptic actuator on the mobile DPS, again synced to the animation and sound effects. The intensity of this haptic effect may again be adjusted on the expected severity of the thunderstorm (e.g., even more intense) and may be synced to the audio and visual effects. After additional user input or a predetermined amount of time, the multi-sensory effects may stop at operation 358.

Figure 4:
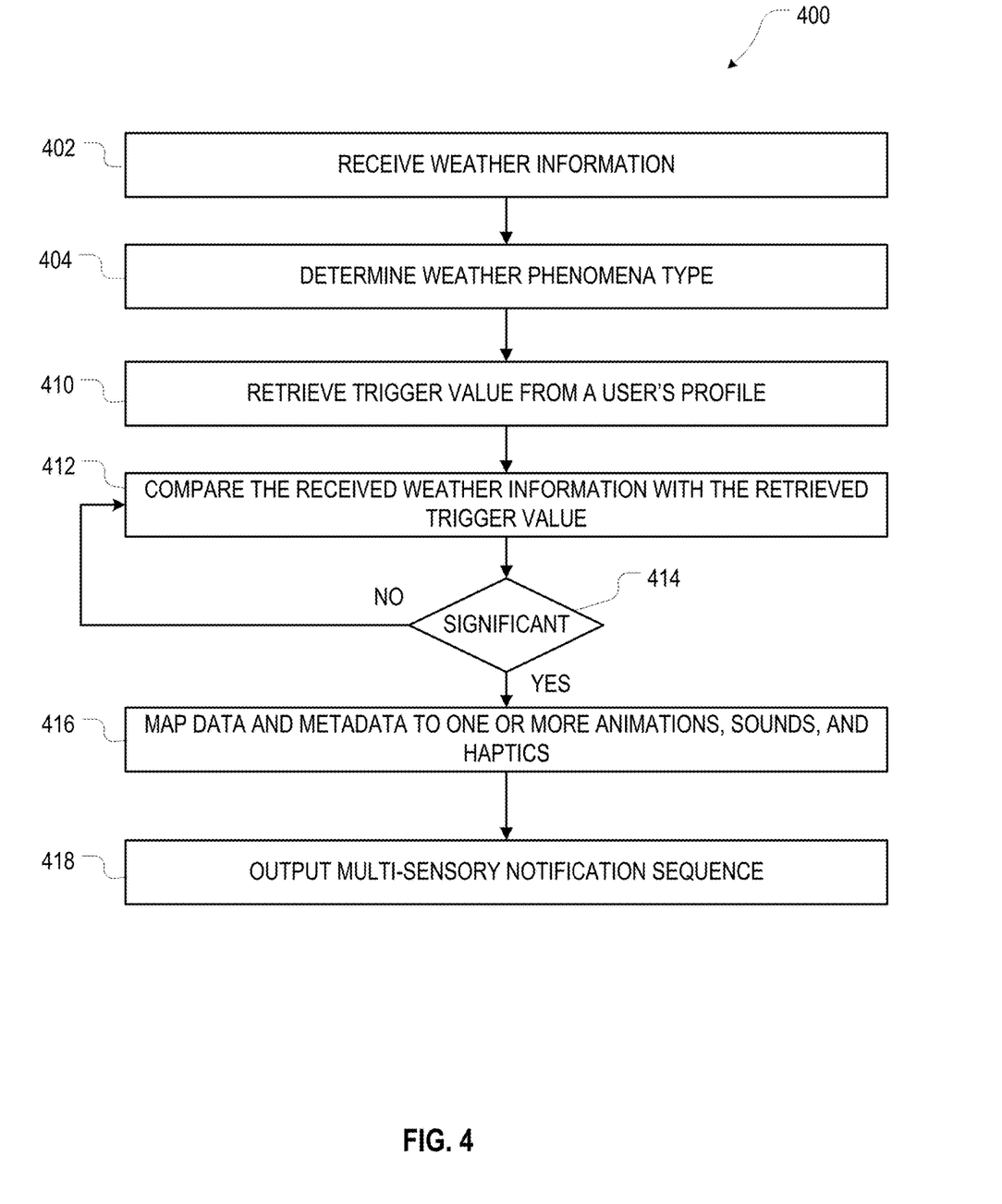
FIG. 4 illustrates an example flow diagram of a process for the receipt and processing of data and metadata by a mobile app, consistent with some embodiments.

FIG. 4 is an example flow diagram of a process 400 of the receipt and processing of data and metadata by the mobile app 205, as applied to the continuing illustrative example of weather data, and consistent with some embodiments. The process 400 in some embodiments may create a multi-sensory notification experience, including animations, sounds, and haptics customized for a particular weather phenomena, to better convey "what the weather means to the viewer" or "how the weather will affect the viewer."

In one embodiment, the mobile app 205 may begin at operation 402 by receiving weather information from the server DPS 100b. The mobile app 205 may determine the type of phenomena represented by the information at operation 404. At operation 410, the mobile app 205 may retrieve a corresponding trigger value(s) from a user's profile and may compare the received weather information with the retrieved trigger value(s) at operation 412. These trigger values in some embodiments may include user-customized settings of what phenomena (e.g., temperature, snowfall, rainfall, lightning, etc.) for which they wish to receive notifications.

If the trigger value indicates that received weather data and metadata is not significant to the end user (at operation 414), then the mobile app 205 may return to operation 402. However, if the trigger value indicates that received data and metadata is relevant, then the mobile app 205 may continue executing at operation 416, where the data and metadata may be mapped to one or more animations, sounds, and haptics. For example, the code may be representative of a thunderstorm. As such, a series of animation graphics that depict heavy rain fall and simulated flashes indicative of lightning may be displayed, a sound of recorded thunder may be play, and a series of intense vibrations indicative of lightning and thunder may be performed. In some implementations, the animation, sound, and vibration patterns may be reusable sub-sequences that may be arranged or sequenced to create the complete multi-sensory sequence. In other implementations, the animation, sound, and vibration patterns may be complete sequences stored in the mobile app 205. Additionally, the multi-sensory sequence may have a predetermined length specified by the mobile app 205 in a configuration file, or may be designed to repeat until canceled by the end user. The retrieving and/or building of the multi-sensory sequences may be performed for weather phenomena at the selected areas of interest, in accordance with the end user profile.

In some implementations, the library of multi-sensory sequences may be periodically updated in view of changing seasons, holidays, advertising campaigns, sporting events, local events, time-of-day, etc. Multiple versions of the sequences may be also stored in the mobile DPS 100a. For example, day and night versions of the animation graphics may be stored such that an animation sequence may be created having the appropriate time of day characteristics.

At operation 418, the multi-sensory notification sequence may be output by the mobile DPS 100a. This may include displaying the animations on the integrated display 280, the sound on the integrated speaker 282, and the vibration pattern using the haptic system 284.

Example Animation Sequences

Figure 5A:
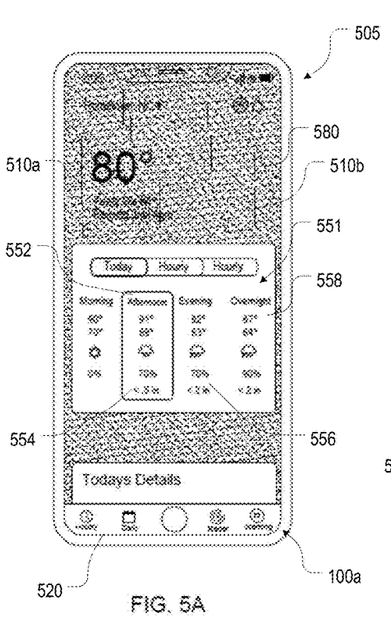
FIGS. 5A-5B collectively depict a multi-sensory notification sequence designed to convey what a forecast of rain will feel like to the end user, consistent with some embodiments.
Figure 5B:
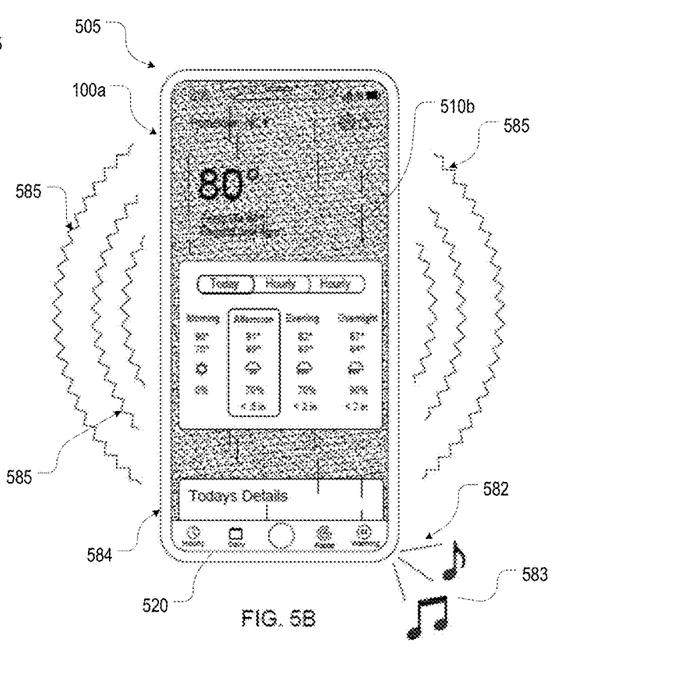

FIGS. 5A-5B and FIGS. 6A-6C illustrate example, non-limiting, multi-sensory notification sequences. Each notification sequence includes a representative number of still images, video, audio, and/or haptic feedback depicted at different times and arranged in a sequence to create a multi-sensory notification. Other sequences are within the scope of the disclosure. For example, FIGS. 5A-5B illustrate two images, whereas another sequence may contain three or four images. It is noted that any number of images or video clips may be sequenced to create the notification sequence in accordance with the processes described herein.

FIGS. 5A-5B collectively depict a multi-sensory notification sequence 505 on the display 580 designed to convey what a forecast of rain will feel like to the end user, consistent with some embodiments. FIGS. 5A-5B may include a temperature time-frame 551 being displayed on an integrated display 580 of a mobile DPS 100a. The temperature time-frame 551 may contain breakouts for morning 552, afternoon 554, evening 556, and overnight 558, with the afternoon breakout 554 being further shown as selected by the user. The mobile DPS 100a may also include an integrated speaker 582 and an integrated haptic system (not shown) that produce sounds 583 and haptic vibration patterns 585, respectively.

The animation sequence 505 may include a number of raindrops 510a, 510b at first positions on the display 580 in FIG. 5A. The raindrops 510a, 510b are then shown at second positions on the display 580 in FIG. 5B (only some raindrops 510 labeled for clarity). The second positions for each corresponding raindrop 510a, 510b are closer to a bottom edge 520 of the display 580 than the first positions, suggesting that the raindrops 510 are falling. FIGS. 5A-5B further illustrate a haptic vibration pattern 570 being emitted by the haptic system 584 of the mobile DPS 100a. This haptic vibration pattern 585 may also be related to synced with the animation being displayed on the display 580. FIGS. 5A-5B further illustrate a series of raindrop sounds 583 being emitted from speaker 582 of the mobile DPS 100a.

Figure 6A:
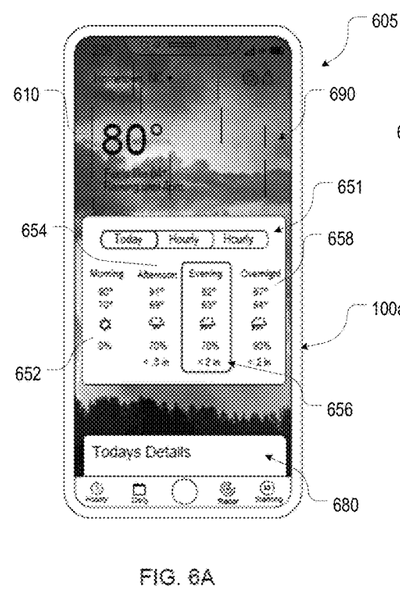
FIGS. 6A-6C collectively depict a multi-sensory notification sequence designed to convey what a forecast of thunderstorms will feel like to the end user, consistent with some embodiments.
Figure 6B:
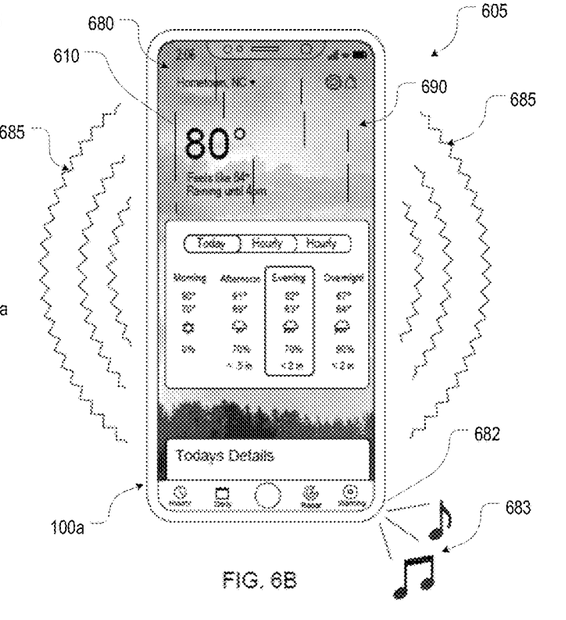
Figure 6C:
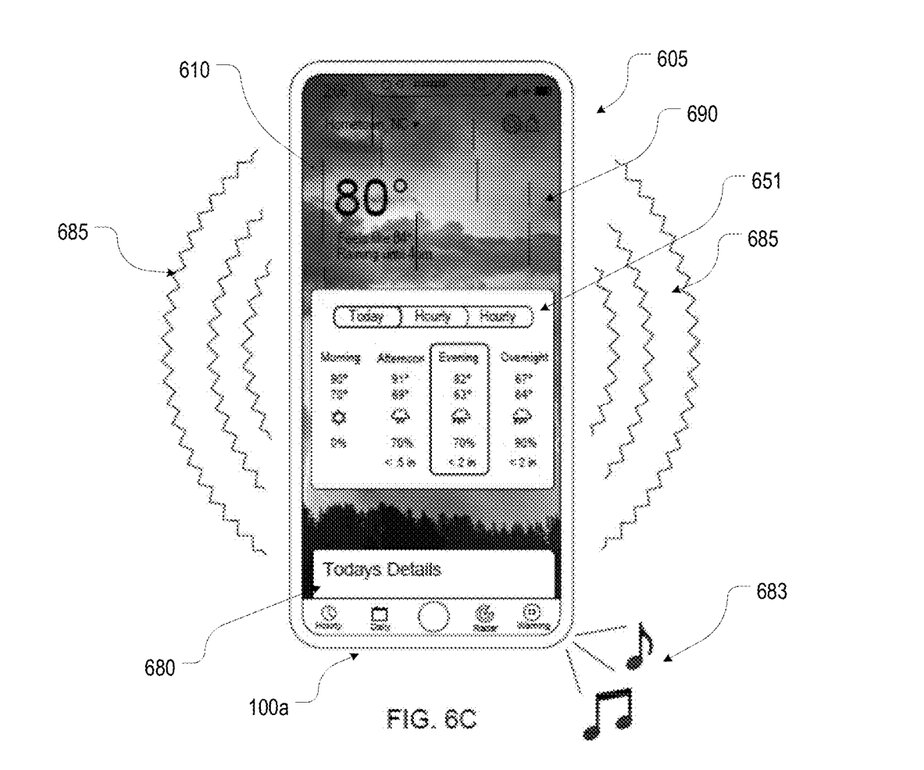

FIGS. 6A-6C collectively depict a multi-sensory notification sequence 605 on the display 680 designed to convey what a forecast of thunderstorms will feel like to the end user, consistent with some embodiments. FIGS. 6A-6C may include a temperature time-frame 651 being displayed on an integrated display 680 of a mobile DPS 100a, consistent with some embodiments. The temperature time-frame 651 may contain breakouts for morning 652, afternoon 654, evening 656, and overnight 658, with the evening breakout 656 depicted as selected. The mobile DPS 100a may also include an integrated speaker 682 and an integrated haptic system 684.

The sequence may include a thunderstorm background images 690, 692, 694 containing substantially identical patterns of clouds. One of the background images 692, however, uses lighter colors and/or brighter background lighting to provide a multi-sensory representation of a lightning strike. The thunderstorm background images 690, 692, 694 may further contain a number of simulated raindrops, animated to look like they are falling, as described in more detail with respect to FIGS. 5A-5B.

FIGS. 6A-6C further illustrate a haptic vibration pattern 685 being emitted by the haptic system of the mobile DPS 100a. This haptic vibration pattern 670 may also be related to synced with the animation being displayed on the display 680. In some embodiments, the haptic pattern 685 may be more intense (e.g., more frequent vibrations, stronger vibrations, etc.) than the haptic pattern 585 in FIGS. 5A-5B, suggesting the more intense nature of the thunderstorm event over a rainstorm event. FIGS. 6A-6C further illustrate the sound of thunder 683 being emitted from speaker 682 of the mobile DPS 100a. The volume and rhythm of the thunder sounds 683 may additionally be synced to the simulated lightning background image 692.

As would now be understood by one of ordinary skill in the art, other multi-sensory animation sequences may be created in accordance with the present disclosure. Further, the animation sequences may be tailored to specific locations, advertising campaigns, events, etc., as noted above. For example, the local football team logo may be used during the football season, advertiser logos may be used during adverting campaigns, holiday elements may be added, etc.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

General

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A method for dynamically presenting a multi-sensory notification on a mobile weather application, comprising:
   receiving alert preferences from a user at a mobile data processing system, wherein the alert preferences comprise at least one selected phenomena and associated multi-sensory notifications;
   receiving, at the mobile data processing system, real time data about at least one of the selected phenomena;
   comparing the received real time data to the alert preferences;
   generating, by the mobile data processing system, a mufti-sensory experience responsive to the comparing;
   receiving a path of travel for the user;
   forecasting, by the mobile data processing system, expected conditions along the path of travel;
   associating the user's time, location and expected conditions based on the forecasting; and
   presenting the generated multi-sensory experience to the user; wherein the multi-sensory experience includes:
      presenting an animation, a sound, and a haptic pattern reflecting the selected phenomena; and
      dynamically adjusting an intensity of at least one of the sound and the haptic pattern to correspond to a significance of the real-time data about the at least one of the selected phenomena and the alert preferences corresponding to the user's associated time, location and expected conditions.

2. The method of claim 1, wherein the user selection is a tap and hold gesture.

3. The method of claim 1, wherein a rain forecast presents rain drop sounds and vibrations below a predefined threshold value.

4. The method of claim 1, wherein a storm forecast presents thunder sounds and vibrations above a predefined threshold value.

5. The method of claim 1, wherein an accumulation of rain is reflected dynamically on a screen of the mobile weather application.

6. The method of claim 2, wherein the application is a health application.

7. The method of claim 6, wherein an indication of undesirable exposure is adjusted based on a predicted risk of the exposure.

8. The method of claim 2, wherein the animation is synced with the sound and the haptic pattern.

9. The method of claim 1, further comprising transmitting the real time data to the mobile data processing system to trigger the generation of the multi-sensory experience.

10. The method of claim 9, further comprising transmitting weather data to the mobile data processing system.

11. A computer program product for dynamically presenting a multi-sensory notification in a mobile weather application, the computer program product comprising a computer readable storage medium having program instructions embodied therewith, the program instructions executable by a processor to cause the processor to:
   receive alert preferences from a user, wherein the alert preferences comprise at least one selected phenomena and associated multi-sensory notifications;

receive real time data about at least one of the selected phenomena;

compare the received real time data to the alert preferences;

generate a multi-sensory experience responsive to the comparing;

receive a path of travel for the user;

forecast, by the mobile data processing system, expected conditions along the path of travel;

associate the user's time, location and expected conditions based on the forecasting; and present the generated multi-sensory experience to the user; wherein the multi-sensory experience includes:

presenting an animation, a sound, and a haptic pattern reflecting the selected phenomena; and dynamically adjusting an intensity of the haptic pattern to correspond to a significance of the real-time data about the at least one selected phenomena and the alert preferences corresponding to the user's associated time, location and expected conditions.

12. The computer program product of claim 11, wherein a rain forecast presents rain drop sounds and vibrations below a predefined threshold intensity value.

13. The computer program product of claim 11, wherein a storm forecast presents thunder sounds and vibrations above a predefined threshold intensity value.

14. The computer program product of claim 11, further comprising transmitting the real time data to the mobile data processing system to trigger the generation of the multi-sensory experience.

15. The computer program product of claim 14, further comprising transmitting weather data to the mobile data processing system.

16. The computer program product of claim 11, wherein the sound and the haptic pattern are synced with the animation.

17. A system for dynamically presenting a multi-sensory notification on a mobile weather application, for weather events, comprising:

a mobile data processing system, comprising a processor and a memory, the memory containing program instructions for a mobile weather application, wherein the mobile weather application causes the processor to:

receive alert preferences, wherein the alert preferences comprise at least one of selected weather events and associated multi-sensory notifications;

receive a path of travel for the user; receive real time weather data; forecast weather conditions along the path of travel;

compare the forecast to the alert preferences;

generate a multi-sensory experience based on the comparing;

receive a path of travel for the user;

forecast, by the mobile data processings system, expected conditions along the path of travel;

associate the user's time, location and expected conditions based on the forecasting;

present the generated multi-sensory experience to the user reflecting the weather forecast along the path of travel, wherein the multi-sensory experience includes:

presenting an animation, a sound, and a haptic pattern reflecting the real time data about the selected weather forecast, wherein:

a rain forecast presents rain drop sounds and vibrations below a predefined threshold intensity value;

a storm forecast presents thunder sounds and vibrations above a predefined threshold intensity value; and the animation is synced with the sound and the haptic pattern; and dynamically adjusting the intensity of the sound and the haptic pattern to correspond to the forecast and the alert preferences corresponding to the user's associated time, location and expected conditions.

18. The system of claim 17, farther comprising a server data processing system that transmits signals to the mobile data processing system to trigger the presentation of the multi-sensory experience at the mobile data processing system.

* * * * *